US008340630B1

(12) United States Patent
Ward

(10) Patent No.: US 8,340,630 B1
(45) Date of Patent: Dec. 25, 2012

(54) REMOTELY ACTIVATABLE LOCATOR WITH BACKCHANNEL

(75) Inventor: Matthew L. Ward, Collegeville, PA (US)

(73) Assignee: TruePosition, Inc., Berwyn, PA (US)

( * ) Notice: Subject to any disclaimer, the term of this patent is extended or adjusted under 35 U.S.C. 154(b) by 0 days.

(21) Appl. No.: 13/151,584

(22) Filed: Jun. 2, 2011

(51) Int. Cl.
*H04M 11/04* (2006.01)

(52) U.S. Cl. .................. 455/404.2; 455/414.1; 455/403; 455/404.1

(58) Field of Classification Search ....... 455/403–404.2, 455/466
See application file for complete search history.

(56) References Cited

U.S. PATENT DOCUMENTS

| | | | |
|---|---|---|---|
| 4,908,629 A | 3/1990 | Apsell et al. | |
| 5,021,794 A | 6/1991 | Lawrence | |
| 5,485,163 A | 1/1996 | Singer et al. | |
| 5,652,570 A | 7/1997 | Lepkofker | |
| 5,742,233 A | 4/1998 | Hoffman et al. | |
| 5,929,777 A | 7/1999 | Reynolds | |
| 6,067,018 A | 5/2000 | Skelton et al. | |
| 6,154,658 A | 11/2000 | Caci | |
| 6,243,039 B1 | 6/2001 | Elliot | |
| 6,275,164 B1 | 8/2001 | MacConnell et al. | |
| 6,360,106 B1 | 3/2002 | Besson | |
| 6,362,778 B2 | 3/2002 | Neher | |
| 6,449,472 B1 | 9/2002 | Dixit et al. | |
| 6,593,851 B1 | 7/2003 | Bornstein | |
| 6,693,585 B1 | 2/2004 | MacLeod | |
| 7,084,771 B2 | 8/2006 | Gonzalez | |
| 7,102,508 B2 | 9/2006 | Edelstein et al. | |
| 7,330,122 B2 | 2/2008 | Derrick et al. | |
| 7,437,167 B2 | 10/2008 | Kartchner | |
| 7,446,664 B2 | 11/2008 | White | |
| 7,598,855 B2 | 10/2009 | Scalisi et al. | |
| 2002/0186135 A1 | 12/2002 | Wagner | |
| 2003/0050039 A1 | 3/2003 | Baba et al. | |
| 2003/0086539 A1* | 5/2003 | McCalmont et al. | ........... 379/45 |
| 2004/0081139 A1 | 4/2004 | Beckmann et al. | |
| 2004/0121822 A1 | 6/2004 | Kartchner | |
| 2004/0203601 A1 | 10/2004 | Morriss et al. | |
| 2004/0230823 A1 | 11/2004 | Zakaria | |
| 2005/0014482 A1 | 1/2005 | Holland et al. | |
| 2005/0136885 A1 | 6/2005 | Kaltsukis | |
| 2005/0153729 A1 | 7/2005 | Logan | |
| 2006/0028346 A1 | 2/2006 | White et al. | |

(Continued)

FOREIGN PATENT DOCUMENTS

EP          1617639          1/2006

(Continued)

OTHER PUBLICATIONS

U.S. Appl. No. 11/198,996, filed Aug. 8, 2005, Ward.

(Continued)

*Primary Examiner* — Jinsong Hu
*Assistant Examiner* — Nathan Taylor
(74) *Attorney, Agent, or Firm* — Woodcock Washburn LLP

(57) ABSTRACT

A method for use in providing emergency services to a locator device comprises remotely triggering the locator device. This causes the locator device to employ a first wireless transceiver to communicate with a control center and to employ a second wireless transceiver to initiate an emergency services call to a public services answering point (PSAP). Information relating to the locator device is provided from the control center to the PASP using a backchannel communications channel.

16 Claims, 10 Drawing Sheets

U.S. PATENT DOCUMENTS

| | | | |
|---|---|---|---|
| 2006/0255935 | A1 | 11/2006 | Scalisi et al. |
| 2007/0086578 | A1* | 4/2007 | Hansen et al. ................. 379/45 |
| 2007/0155412 | A1* | 7/2007 | Kaltsukis ..................... 455/466 |
| 2007/0287409 | A1 | 12/2007 | Hwang |
| 2008/0227427 | A1* | 9/2008 | Kadavallur et al. ........... 455/403 |
| 2008/0301799 | A1* | 12/2008 | Arnold et al. .................. 726/14 |
| 2009/0131054 | A1 | 5/2009 | Zhang |
| 2009/0186596 | A1 | 7/2009 | Kaltsukis |
| 2010/0304773 | A1 | 12/2010 | Ramprashad |

FOREIGN PATENT DOCUMENTS

| | | |
|---|---|---|
| GB | 2394147 | 11/2002 |
| GB | 2407937 | 5/2005 |
| GB | 2409363 | 6/2005 |
| JP | 2004-517423 | 6/2004 |
| JP | 2005-142875 | 6/2005 |
| JP | 2005-521350 | 7/2005 |
| WO | WO 95/03553 | 2/1995 |
| WO | WO 96/26614 | 8/1996 |
| WO | WO 02/39643 | 5/2002 |
| WO | WO 03/081939 | 10/2003 |

OTHER PUBLICATIONS

U.S. Appl. No. 11/323,265, filed Dec. 30, 2005, Beckley.

3$^{rd}$ Generation Partnership Program, "IP Multimedia Core Network Subsystem (IMS) Multimedia Telephony Service and supplementary services; Stage 1", Mar. 2011, 3GPP TS 22.173, V11.2.0, 67 pages.

International Patent Application No. PCT/US2008/001845: International Search Report and Written Opinion dated Jun. 26, 2008, 9 pages.

International Patent Application No. PCT/US2011/056199: International Search Report and Written Opinion dated Nov. 16, 2011, 11 pages.

The National Emergency Numbering Association, "NENA Standard for NG9-1-1 Additional Data, NENA 71-001", Sep. 17, 2009, Version 1.0, 28 pages.

The National Emergency Numbering Association, "Use Cases & Suggested Requirements for Non-Voice Centric (NVC) Emergency Services", Jan. 11, 2011, NENA 73-501, Version 1.0, 41 pages.

* cited by examiner

REMOTELY ACTIVATABLE LOCATOR WITH BACKCHANNEL

TECHNICAL FIELD

The present invention relates generally to methods and apparatus for locating wireless devices, also called mobile stations (MS), such as those used in analog or digital cellular systems, personal communications systems (PCS), enhanced specialized mobile radios (ESMRs), and other types of wireless communications systems. More particularly, but not exclusively, the present invention relates to methods for obtaining a location estimate from a remotely activated personal wireless device for delivery to a public safety organization while simultaneously relaying the conversation between a caretaker and response agency.

BACKGROUND

This patent application is related in subject matter to U.S. patent application Ser. No. 12/904,904, filed Oct. 14, 2010, entitled "Remotely Activatable Locator with Voice/Data Relay," which is a continuation-in-part of U.S. patent application Ser. No. 12/686,239, filed Jan. 12, 2010, entitled "Remotely Activatable Locator System and Method Using a Wireless Location System," which is a continuation-in-part of U.S. patent application Ser. No. 12/029,951, filed Feb. 12, 2008, entitled "Remotely Activatable Locator System and Method," which claims the benefit of U.S. Provisional Patent Application No. 60/889,426, filed Feb. 12, 2007. The contents of these applications are hereby incorporated by reference in their entireties.

Personal tracking devices have been found to be useful in locating lost objects and, more importantly, missing persons. Such tracking devices typically use a network of Global Positioning Satellites (GPS) in low earth orbit that broadcast precise timing signals from on-board atomic clocks. Using triangulation formulas, a device that picks up signals from several satellites simultaneously can determine its position in global coordinates, namely latitude and longitude. Thus, an object and/or person carrying the GPS device may be located provided the appropriate equipment and trained personnel are available for determining the location of the GPS device. However, GPS signals, like any other satellite signal, are prone to numerous interferences including atmospheric disturbances, such as solar flares and naturally occurring geomagnetic storms. In addition, man-made interference can also disrupt, or jam, GPS signals. Further, anything that can block sunlight can block GPS signals. This raises the question of whether or not GPS is reliable in locating a missing and wandering person who may be in, or next to, a building, under a tree, in the brush, under a bridge, in an urban environment, in a vehicle or even a person who has fallen down and has their GPS unit covered by their own body.

Other known tracking devices use radio signal emitting transmitters. However, these types of tracking devices require an expensive receiver device in the area to receive and track the emitted radio signal. Thus, without the appropriate receiving device in the area and/or trained personnel capable of operating the receivers, these tracking devices would be useless for locating lost objects and/or missing persons.

Overview of Emergency Call Location

In a series of orders (including FCC Orders 96-264, 99-96, and 99-245), under docket 94-102, the United States Federal Communications Commission (FCC) mandated that wireless (Cellular, Personal Communications Systems (PCS), Specialized Mobile Radio (SMR)) carriers support emergency services calling for wireless phone users. The FCC's Enhanced 9-1-1 Phase II, emergency services for wireless users with automatic high accuracy location, was scheduled for implementation in October 2001.

The European Union and member nations followed suit in implementing a universal short-code emergency services number (1-1-2) with "best-effort" location in 2003 and the telematics-focused "eCall" initiative. eCall is expected to be implemented co-incident with the operational status of the "Galileo" Global Navigation Satellite System (GNSS). Galileo is to be similar in function to the United States NavStar Global Positioning System (GPS).

Standardization of Emergency Call Location

To allow for delivery of caller location to the emergency responders (in the United States, a public safety answering point (PSAP) commonly handles dispatching Fire, Police, or Ambulance first responders based on 9-1-1 emergency calls) across multi-vendor networks, standardization efforts were undertaken prior to deployment. A joint European Telecommunications Standards Institute (ETSI) and American National Standards Institute (ANSI) project, facilitated by the Telecommunications Industry Alliance (TIA) and industry representatives, was conceived to handle standardization for the North American market.

The methods and means for position reporting to emergency services systems, as mandated by the FCC in the E911 Phase II mandate, was addressed for North American wireless carriers in Joint ETSI/ANSI Standard 36 (J-STD-036). The J-STD-036 standard provides basic definitions, formats and constraints, and defines the messaging required to transfer identity information, call control information and location-reporting about wireless emergency services callers between wireless and wired network servers enabling coordination between public safety agencies, wireless carriers, equipment manufacturers, and local wireline carriers.

A wireless location system determines geographic position and, in some cases, the speed and direction of travel of wireless devices. Wireless location systems use uplink (device-to-network) signals, downlink (network-to-device) signals, or non-communications network signals (fixed beacons, terrestrial broadcasts, and/or satellite broadcasts). Network-based location solutions use specialized receivers and/or passive monitors within, or overlaid on, the wireless communications network to collect signaling used to determine location. Network-based techniques include uplink Time-Difference-of-Arrival (TDOA), Angle-Of-Arrival (AOA), Multipath Analysis (RF fingerprinting), and signal strength measurement (SSM).

Mobile-based location solutions use the mobile receivers or ancillary receivers in the mobile device to collect signaling from the wireless network, satellite broadcasts or terrestrial broadcasts. Mobile-based techniques may use assistance data (for instance broadcast information) but calculate the position estimate locally. Mobile-based location solutions may be WCN independent (where WCN refers to the wireless communications network).

Mobile-assisted location solutions employ the mobile receiver or ancillary receivers in the mobile device to collect signaling from the wireless network, satellite broadcasts or terrestrial broadcasts. Mobile-assisted location takes advantage of assistance data delivered over the wireless network and delivers collected signal data to a landside server for final position estimation.

Mobile-based or Mobile-assisted (e.g. Device-based) location techniques include CID (serving Cell-ID), CID-RTF (serving cell-ID plus radio time-of-flight time-based ranging), CIDTA (serving cell-ID plus time-based ranging), Enhanced Cell-ID (ECID, a serving cell, time-based ranging and power difference of arrival hybrid), Advanced-Forward-Link-Trilateration (AFLT), Enhanced Observed Time Difference (E-OTD), Observed-Time-Difference-of-Arrival (OT-DOA) and Global Navigation Satellite System (GNSS) positioning. An example of a GNSS system is the United States NavStar Global Positioning System (GPS).

Hybrids of the network-based and mobile device-based techniques can be used to generate improved quality of services including improved speed, accuracy, yield, and uniformity of location. Hybrids also provide a fall-back location capability in case of location failure.

Subscriber Identity Module (SIM)

A dual SIM mobile phone is one which holds two SIM cards in order for the subscriber to maintain two subscriptions with two different network operators with one mobile device. Originally, dual SIM phones switched between the active and standby SIMS and between WCNs allowing a split between paging and origination to optimize coverage and cost. Such standby dual SIM phones typically had a single wireless transceiver module. Newer, active dual SIM phones hold two SIM cards and two wireless transceiver modules and allow for concurrent registration and operation in two wireless communications networks. The term "SIM" is used herein in place of the Global System for Mobility (GSM) Subscriber Identity Module (SIM), the $3^{rd}$ Generation Partnership Program (3GPP) Universal Subscriber identity module (U-SIM), The $3^{rd}$ Generation Partnership Program 2 (3GPP2) CDMA Subscriber Identify Module (CSIM) or Removable User Identity Module (R-UIM) and the 3GPP's 4G Subscriber Identity Module (4GSIM).

The air interface protocols now used in the wireless industry include AMPS, N-AMPS, TDMA, CDMA, TS-CDMA, OFDM, OFDMA, GSM, TACS, ESMR, GPRS, EDGE, UMTS, WCDMA, WiMAX, LTE and others. The term CDMA will be used to refer to the CDMA digital cellular (TIA/EIA TR-45.4 defined IS-95, IS-95A, IS-95B), Personal Communications Services (J-STD-008), and 3GPP2 defined CDMA-2000 and UMB standards and air interfaces. The term UMTS will be used to refer to the 3GPP specified Wideband-CDMA (W-CDMA) based Universal Mobile Telecommunications System, defining standards, and radio air interface. The term WiMAX is used to denote the IEEE defined 802.16, "Broadband Wireless"; 802.20, "Mobile Broadband Wireless Access"; and 802.22, "Wireless Regional Area Networks" technologies. The present invention also applies to the 3GPP defined Long-Term-Evolution (LTE) and the 3GPP LTE-Advanced system among others.

The Next Generation 9-1-1 Initiative is a project to define the system architecture for a all-digital, Internet Protocol (IP)-based delivery of multimedia 9-1-1 "calls." New wireless and IP-based communications devices and services are being rapidly developed, extending the current voice offerings with new capabilities such as text messaging and video messaging. Unfortunately, the current 9-1-1 system was never intended to receive calls and data from phones with these new features and capabilities. Unable to receive text and video messaging, the emergency responders cannot take advantage of the potential lifesaving advances multimedia calling brings.

The National Emergency Numbering Association (NENA) has compiled a list of capabilities for emergency calling that does take advantage of multimedia calling. These services; as described in Annex A of "Use Cases & Suggested Requirements for Non-Voice Centric (NVC) Emergency Services", NENA 73-501, Version 1.0, Jan. 11, 2011; include:

a) Text messaging to a PSAP
b) Text messaging with media (photos, pre-recorded video, or real-time video)
c) Voice call with media (photos, pre-recorded video, or real-time video)
d) Voice call in non-emergency situation
e) Voice call with delayed media (photos, pre-recorded video, or real-time video)
f) Voice call plus text messaging
g) Text messaging with location updates
h) Voice call with location updates
i) Transmission of media (photos, pre-recorded video, or real-time video)
j) Text messaging with emergency indication on device
k) Voice call adding media (photos, pre-recorded video, or real-time video) as PSAP request
l) Real-time video with ASL
m) Real-time video with ASL via relay service Additional call related data for voice and the non-voice calling may also be transmitted via the control data stream. Examples of the additional data can be found in "NENA Standard for NG9-1-1 Additional Data, NENA 71-001, version 1.0, Sep. 17, 2009.

Due to the multi-media limitations of the widely deployed legacy ($2^{nd}$ and $3^{rd}$ generation) wireless systems, the next-generation emergency communications services, it is expected that these services can only be introduced on $4^{th}$ generation systems such as the 3GPP Long Term Evolution (LTE) system and IEEE-802.16e (WIMAX).

SUMMARY

In cases of an emergency location where a locator is attached to a mute subject or object, a locator with voice relay using a dual SIM, dual transceiver module device allows for extended emergency services calling where a $3^{rd}$ party such as a caretaker, care giver, guardian, or custodial organization may be involved in real-time with the automatically located call to provide verbal or textual information to responders.

For example, in a method embodiment of the present invention, upon initiation of an emergency services call from a locator device, a three-way call involving the locator device, a caretaker associated with the locator device, and an emergency services answering point is established. In addition, a location record for the locator device is provided from a database to the answering point while conducting the three-way call.

In another embodiment, a system in accordance with the present invention includes means responsive to the initiation of an emergency services call from the locator device for establishing a three-way call involving the locator device, a caretaker associated with the locator device, and an emergency services answering point, and means for providing a location record for the locator device from a database to the answering point while conducting the three-way call.

In yet another embodiment, a locator device in accordance with the present invention comprises first and second wireless transceiver modules, a first subscriber information module (SIM), and a control processor. In this example embodiment, the locator device is configured to operate in a WCN to establish a control communications path between the locator device and a caretaker, and an emergency call path between the locator device and an answering point, and the control processor is configured for performing signal modification functions including volume control, echo cancellation, interception of DTMF control tones, and insertion of pre-recorded messaging into the control communications path or the emergency call path.

In yet another embodiment, the use of a remotely activatable mobile locator device with multiple wireless transceivers allows multiple simultaneous voice and data connections for multiple voice paths, multimedia messaging, or sensor telemetry data over a legacy WCN. Interconnection of the separate data paths using common identifiers allows for early deployment of advanced location-based services, including next-generation emergency services.

In yet another embodiment, a method for use in providing emergency services to a locator device comprises remotely triggering the locator device and thereby causing the locator device to employ a first wireless transceiver to communicate with a control center and to employ a second wireless transceiver to initiate an emergency services call to a public services answering point (PSAP); and providing information relating to the locator device from the control center to the PASP using a backchannel communications channel. This embodiment may also include providing wireless identifiers corresponding to the locator device in the information provided by the control center to the PSAP to enable the PSAP to associate information received at the PSAP from the locator device and the control center, providing at least one of environmental and medical sensor information from the locator device to the control center and providing this information from the control center to the PSAP via the backchannel communications channel, and providing a location record for the locator device from a database to the PSAP while conducting the emergency services call. In addition, in this embodiment, the backchannel communications channel from the control center to the PSAP may be formed from a first data link from the control center, a public or private digital communications network coupled to the first data link, and a second data link from the to the public or private digital communications network to the PSAP. Furthermore, the communication between the locator device and the control center using the first transceiver may be conducted via the WCN or a WiFi network.

Other aspects of the invention are described below.

BRIEF DESCRIPTION OF THE DRAWINGS

The foregoing summary as well as the following detailed description is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

We will now describe illustrative embodiments of the present invention. First, we provide a detailed overview of the problem and then a more detailed description of our solutions.

A. Rationale Model for Radio Relay

At the request of public safety organizations, the initiation of conference calls (also known as a 3-way or multi-party calls) during emergency services calls is prohibited (e.g. 3GPP TS 22.173 "IP Multimedia Core Network Subsystem (IMS) Multimedia Telephony Service and supplementary services; Stage 1" (section 8.2.13) which is required for all GERAN, UTRAN and E-UTRAN-based wireless communications systems). Since current classes of mobile devices are conference call enabled at the switch (as to preserve valuable radio bandwidth and reduce the cost of the mobile device), there currently is no way around the prohibition. However, in certain custodial cases (e.g. impaired individuals, inanimate objects) the use of conference calling, allowing interconnection of a caretaker to the answering point, would be a great value.

Herein is described a system and method for the use of new type of mobile devices equipped with multiple wireless transceiver modules. These multiple transceiver modules allows the use of the mobile device as a relay with a first (control) leg of the conversational path (mobile device to caretaker) to be connected to the emergency services call center (e.g. the Public Safety answering point (PSAP)) via a second (emergency) radio leg. The term "call leg" includes the wireless connection and wired connection between the mobile locator device and the end-party, either the caretaker or emergency services answering point. A "call" may be either a switched-circuit or packet data connection. "Calls" to the emergency services answering point will be voice calls while "calls" to the caretaker may be voice, short message service, or data sessions.

Enhanced Wireless Emergency Services Calling

Figure 1:
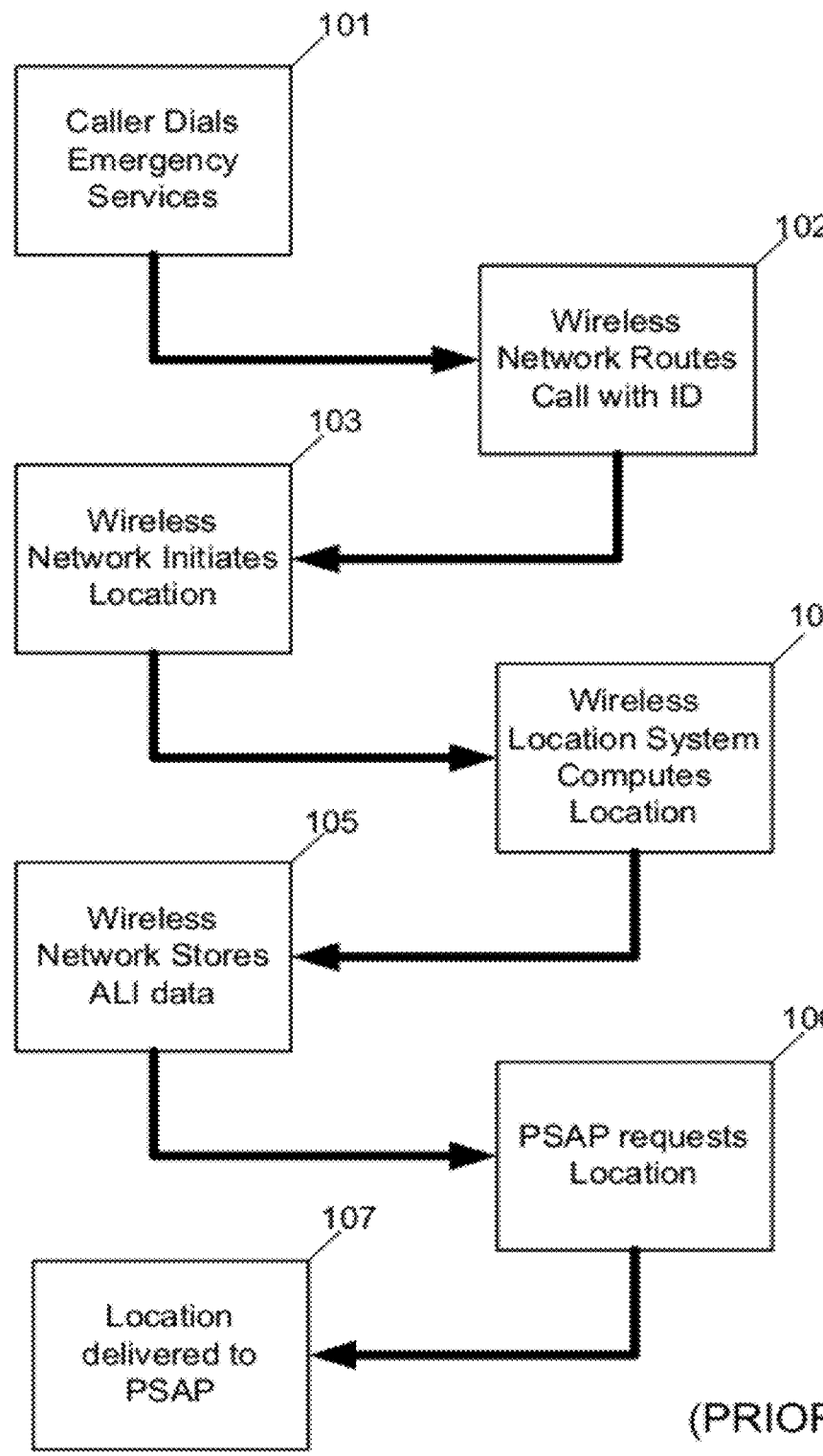
FIG. 1 is an illustration of the steps in an emergency services location process.

A model for current, mobile-phone based, emergency services location process is shown in FIG. 1. The FIG. 1 model uses non-call associated (N-CAS) signaling where the location estimate is performed during the call and the location is calculated and stored until requested. The alternative scenario, call-associated signaling (CAS), would hold delivery of the call until the location estimate is available and can be thus delivered simultaneously with the call connection. The present invention functions in either CAS or N-CAS scenarios.

In the current illustrative emergency services scenario, the caller dials emergency services 101 (typically a short code (e.g. 9-1-1, 1-1-2, 9-9-9) or in some cases a single button that dials the code. The wireless communications network (WCN) identifies the call as emergency services call and then routes the call with identifying information to the default or geographically closest answering point 102. Meanwhile the WCN initiates location for the mobile device 103. The wireless location system (WLS) computes the location using mobile, network or hybrid means 104. The WLS forwards the location to the WCN, which then stores the location and identifiers in the Automatic Location Index (ALI) database 105. At some time during the call, the answering point requests location from the ALI database using the mobile or subscriber identifier 106. The ALI database responds to the location request with the location estimate for the mobile device, possibly with a confidence/error value, speed, and direction of travel 107.

Remotely Activatable Locator with Relay

Using the remote locator for the elderly, under-aged, the infirm, or for property recovery services also involves multiple agencies and actors. Three-way calling is employed so that the locator device can be located using the location-enabled emergency services enabled WCN via a first wireless connection. A second wireless connection is used so that the caretaker, care-giver, legal guardian, call center, or custodian can be included in the conversation with the answering point. The locator may or may not have a speaker and microphone to include the located person in the call.

Figure 2:
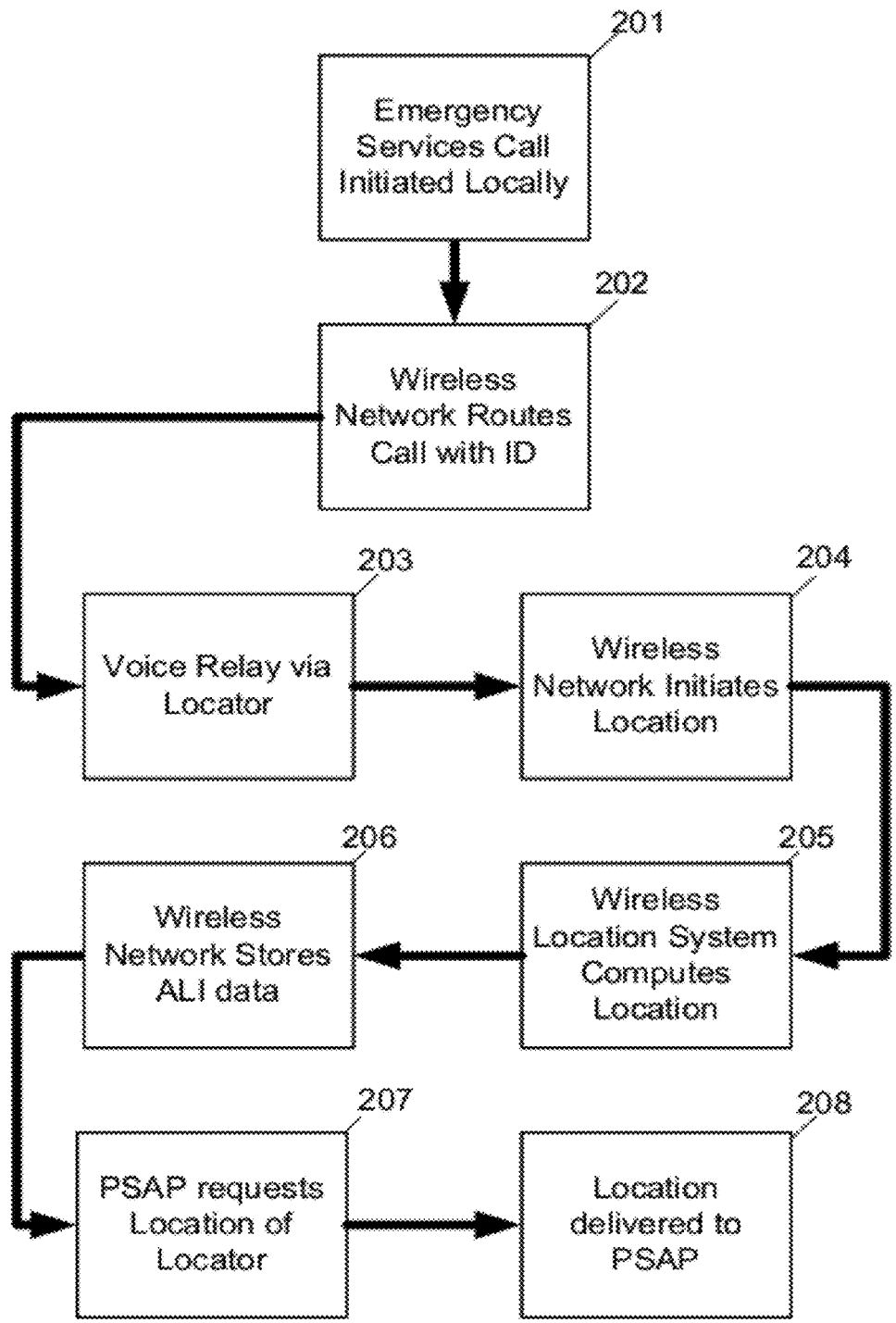
FIG. 2 is an illustration of an example emergency services location process with remote locator with relay activated locally.

Three-way calling may also be employed for cargo and/or asset recovery. The answering points (the local PSAPs) will not allow pre-recorded messages to come in on the emergency services (E911, E112, etc) system for these types of property crimes. Therefore, to locate asset(s) and/or apprehend suspects, it may be necessary to have three-way call capability for the caretaker to actually communicate with the answering point. Since the emergency services enabled WCN supports location of emergency services calls, automatic location of the locator relay device is therefore enabled for the device-to-answering point wireless connection. FIG. 2 depicts a model procedure for the 3-way call with location involving the $3^{rd}$ party caretaker (guardian or recovery services) and the public safety answering point.

The dual radio represents the simplest locator, but locators with more than two radios are envisioned (e.g. cellular, PCS, WiFi, and Bluetooth). These additional radios can be under control of the control center via the control radio path, and can be used to create additional available bandwidth to sensors on the locator (e.g. video) that is collected at the control center and aggregated for delivery via the backchannel. Creation of the additional data bandwidth via addition of radio connections can be done at any time and without disruption of the calls to the answering point or control center.

Remotely Activatable Locator with Backchannel

The locator device provides multiple radio communications paths allowing for the automatic location of the locator and communications between the caretaker and response agency.

In addition to relayed voice communication the additional data channel provided by dual transceiver locator can be used to provide next generation additional services and information in the case of an emergency services call over a legacy WCN. The control center can forward messaging and data to a PSAP. The customer premises equipment (CPE) on the PSAP would then use the wireless identifiers associated with the E911 call and included in the forwarded data to then link the two data streams. Additional multimedia (sound with video or photographs), environmental or medical sensor information from the locator (if so equipped) and data based on the holder/person or attachment (e.g. vehicle, make model, year) information from the control center can also be provided over the direct link between the control center and PSAP over the relayed radio link or a backchannel communications channel.

The control leg need not be a persistent connection and may be terminated and re-tasked by the control center, for instance the control leg my be a voice call relayed via the device to the PSAP and then be switched to provide data from locator-based sensors without disruption of the call leg directed to the answering point.

Actual use of the call-concurrent telemetry services is precluded on legacy wireless communications networks (GSM, UMTS, IS-29, IS-2000) due to the single-threaded, relatively low bandwidth nature of these networks. Use of the dual locator allows early deployment of the multimedia, telemetry and databased background information services on these legacy networks.

FIG. 2—Local Activation of Remote Locator Relay

FIG. 2 shows the basic procedure for the local activation, call initiation, automatic location, and interconnection of the caretaker and the answering point via the relay locator. Local activation allows the mobile device to generate two wireless connections (either simultaneously or sequentially) via the dual wireless transceiver modules. Local activation can in response to a push button, timer, geo-fence crossing, or external triggering(s) such as medical telemetry, environmental sensors, or intrusion alarming.

Whatever the reason for the local activation, an emergency services call would be locally initiated 201 either simultaneously or sequentially with a call to the caretaker. Preferably, the first call to the caretaker would be placed prior or concurrently with the second call to the emergency services answering point. In either case, The WCN identifies one call as an emergency services call and then routes the call with identifying information to the default or geographically closest answering point 202. The locator acts as a relay between the call to the caretaker and the call to the answering point 203 while maintaining two radio connections with one or more WCN. Meanwhile, the WCN initiates location for the mobile device 204 based on the emergency call. The wireless location system (WLS) computes the location using mobile, network or hybrid means 205. The WLS forwards the location to the WCN, which then stores the location and identifiers in the ALI database 206. At some time during the call, the answering point requests location from the ALI database using the mobile or subscriber identifier 207. The ALI database responds to the location request with the location estimate for the mobile device, possibly with a confidence/error value, speed, and direction of travel 208.

Figure 3:
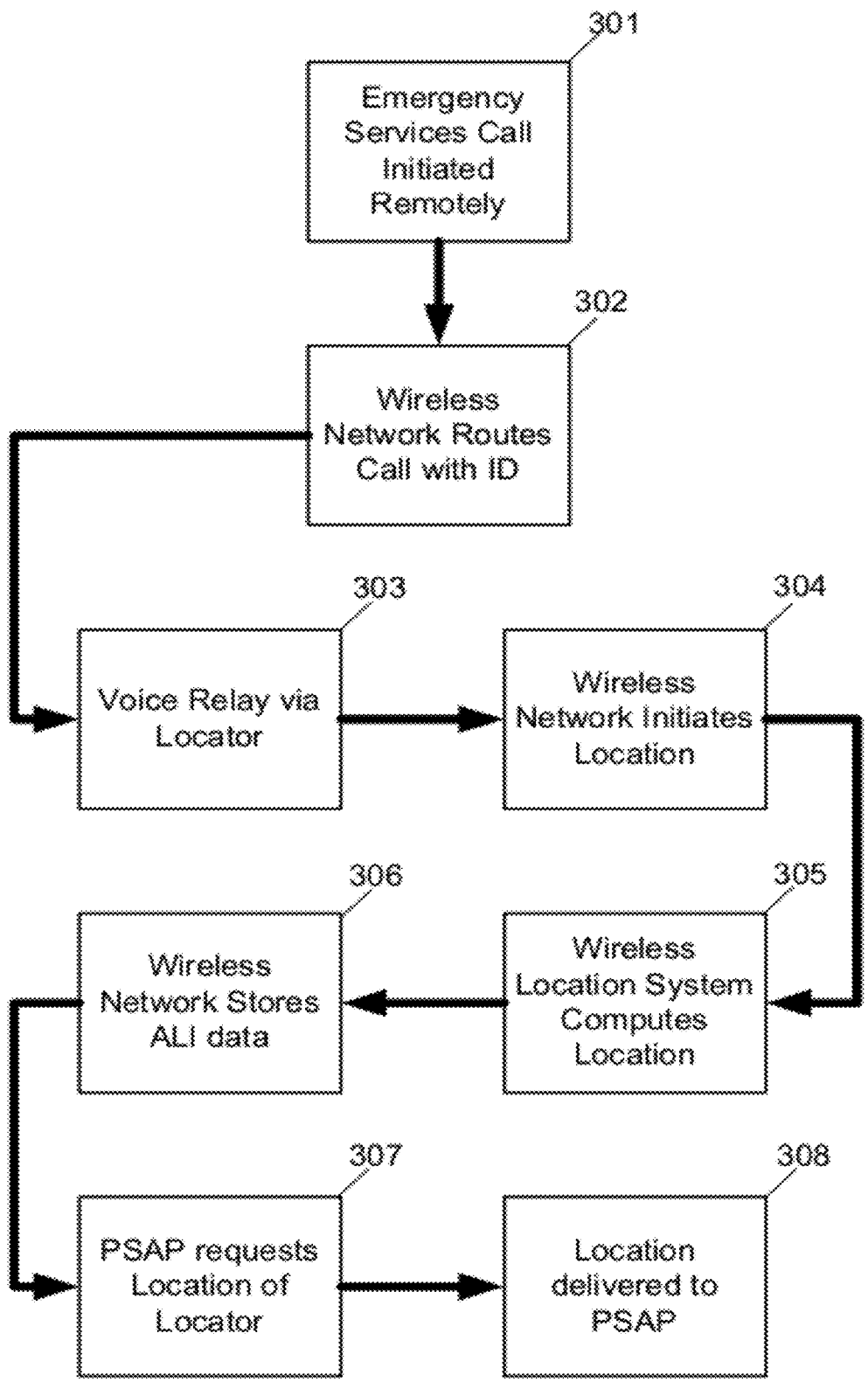
FIG. 3 is an illustration of an example emergency services location process with remote locator with relay activated remotely.

FIG. 3—Remote Activation

FIG. 3 shows the basic procedure for the remote activation, call initiation, automatic location, and interconnection of the caretaker and the answering point via the relay locator. Using in-band signaling remote activation allows the caretaker to connect with the mobile device via one wireless connection and then initiate a second wireless connection via the mobile device. Using out-of-band initiation, for instance when using a Short Message Service (SMS) as a trigger, the mobile device can then generate two wireless connections (either simultaneously or sequentially) via the dual wireless transceiver modules.

As depicted in FIG. 3, a call would be placed from the caretaker to the device, or the device would call the caretaker based on reception of an activation SMS. If the relay locator is activated by an SMS, the locator will preferably initiate the control leg (device to caretaker) leg first. In either case, an emergency services call and potentially the control call, would be remotely initiated 301. The WCN identifies the call as an emergency services call and then routes the call with identifying information to the default or geographically closest answering point 302. The locator acts as a relay between the call to the caretaker and the call to the answering point 303, maintaining the two radio paths and interconnecting the two conversation paths. Meanwhile, the WCN initiates location for the mobile device 304. The wireless location system (WLS) computes the location using mobile, network or hybrid means 305. The WLS forwards the location to the WCN, which then stores the location and identifiers in the ALI database 206. At some time during the call, the answering point requests location from the ALI database using the mobile or subscriber identifier 307. The ALI database responds to the location request with the location estimate for the mobile device, possibly with a confidence/error value, speed, and direction of travel 308.

Both the remote and local activation scenarios, additional parties may be conferenced into the emergency call at either end of the relayed call path. For instance, the caretaker may call family or neighbors or the PSAP may include multiple first responders into the call.

B. Network Model for Radio Relay

Figure 4:
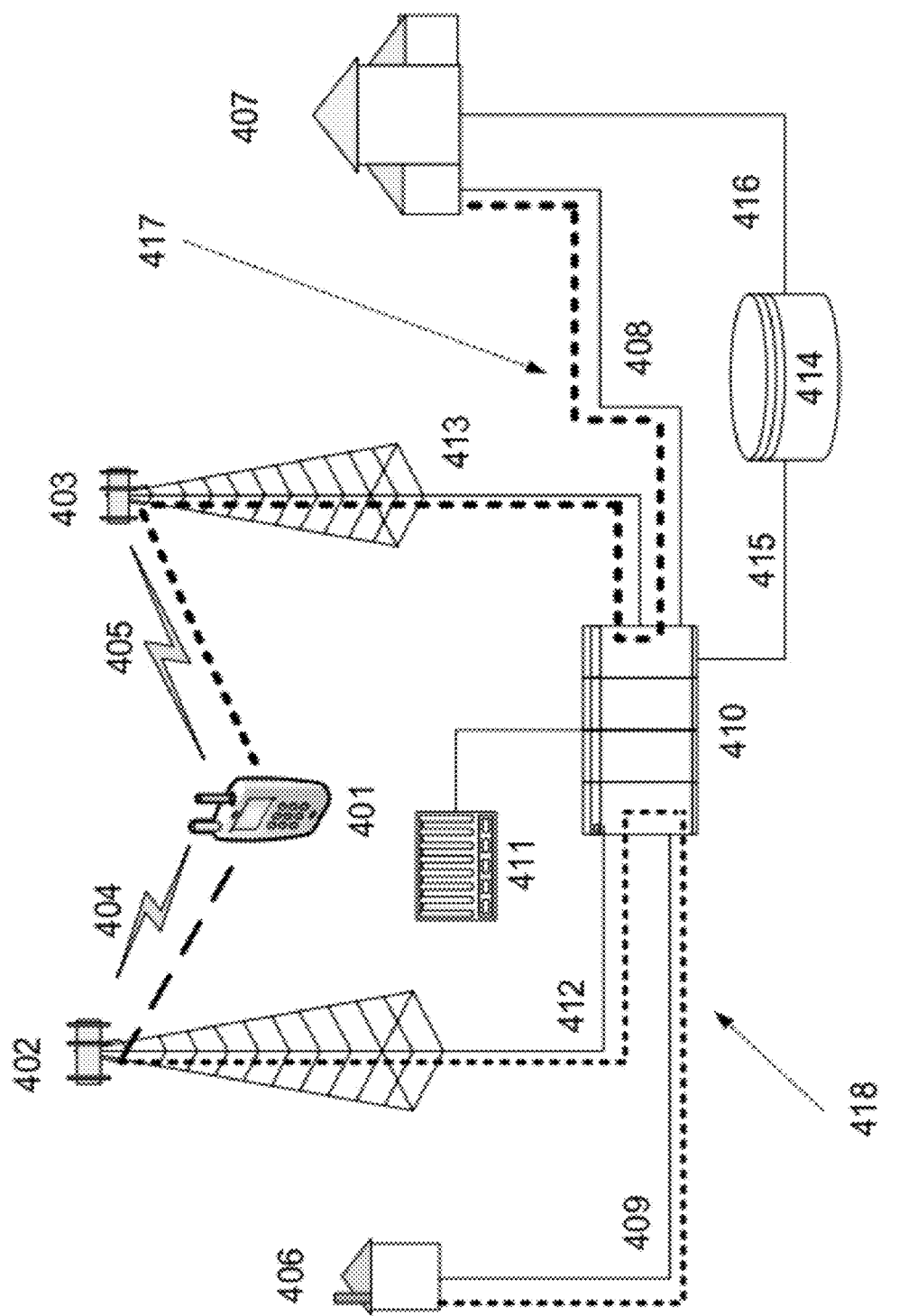
FIG. 4 is an illustration of the interactions between a caretaker, remote locator, wireless network, location network, and emergency services answering point.

FIG. 4—Remote Locator with Relay with Network-Based Location

FIG. 4 depicts an illustrative example of the locator relay operating in a Wireless Communications Network (WCN). In this example, a dual-transceiver module locator 401 is in duplex radio communication with the Radio Access Network (RAN) represented here by the base transceiver station (BTS) towers 402 403. FIG. 4 shows both the control communications path 418 between the locator 401 and the caretaker 406 and the emergency call path 417 between the locator 401 and the answering point 407. The dual-transceiver module locator 301 initiates and maintains the two radio connections, the first 404 for the control path 418 and the second 405 for the emergency path 417. The Central Office (also known as the Core Network (CN)) 410 handles the dialed digit analysis and call interconnection for each communications path 418 417. Interconnection between the control 418 and emergency 417 communication paths is accomplished within the locator 401. For purposes of simplicity, the example in FIG. 4 shows both call legs 417 418 in the same WCN although similar functionality is expected if the call legs were handled by different WCN.

The caretaker 406, whether a spouse, nurse, nursing home, or call center, is responsible for the activation of both the control communications path 418 and emergency communications path 418. Interconnected to the core network 410 via a landline network 409, the caretaker can access the remote locator by simply calling the phone number associated with the locator 401 via the registered SIM. The CN 410, as part of the normal mobility function provided by a WCN, will pass the control call to the radio access network (represented here by the cell towers 402 403 and the associated BTS spans and trunks 412 413) for delivery to the remote locator 301 via a first radio connection 404.

The remote locator 401 has a secure activation capability to prevent inadvertent or malicious activation. One method for secure remote activation uses Short Message Service (SMS) for activation. SMS provides the means to send an activation message payload from an identifiable source. The SMS messages are only processed by the locator if from a trusted source. The activation message contents may be encrypted to provide further security. The Locator 401 does not respond to invalid messages to prevent a possible intruder's detection of a valid mobile identifier (e.g. the Mobile Subscriber Integrated Services Digital Network (ISDN) Number [MS-ISDN]). Preferably, each activation message should be in a particular format or the message will be deemed invalid. Attempted activation via invalid messages can be reported to the caretaker. Use of SMS for remote activation is also beneficial as the store and forward capabilities of the SMS work well with locators that may not be in cell coverage when initially contacted since the wireless communications system will repeatedly page the locator.

Another method for secure remote activation uses a challenge-response method based on the exchange of in-band signals (tones) with the caretaker 406. If supported by the WCN, the locator will be registered as of the very long slotted paging class of mobile devices, increasing battery life.

Once activated, the remote locator 401 will establish a second radio connection 405 for the emergency call, which is then carried via the RAN 403 and CN 410 and associated trunks 413 408 to the answering point 407. Since an emergency call was placed, the WCN will automatically determine the location of the remote locator 401 via the wireless location system 411. In the example non-call-associated scenario, the location is deposited via data link 415 into the ALI database 414. The answering point 407 may at any time query the ALI database 414 via its own data link 416 to obtain the location or request a new location be performed.

Figure 5:
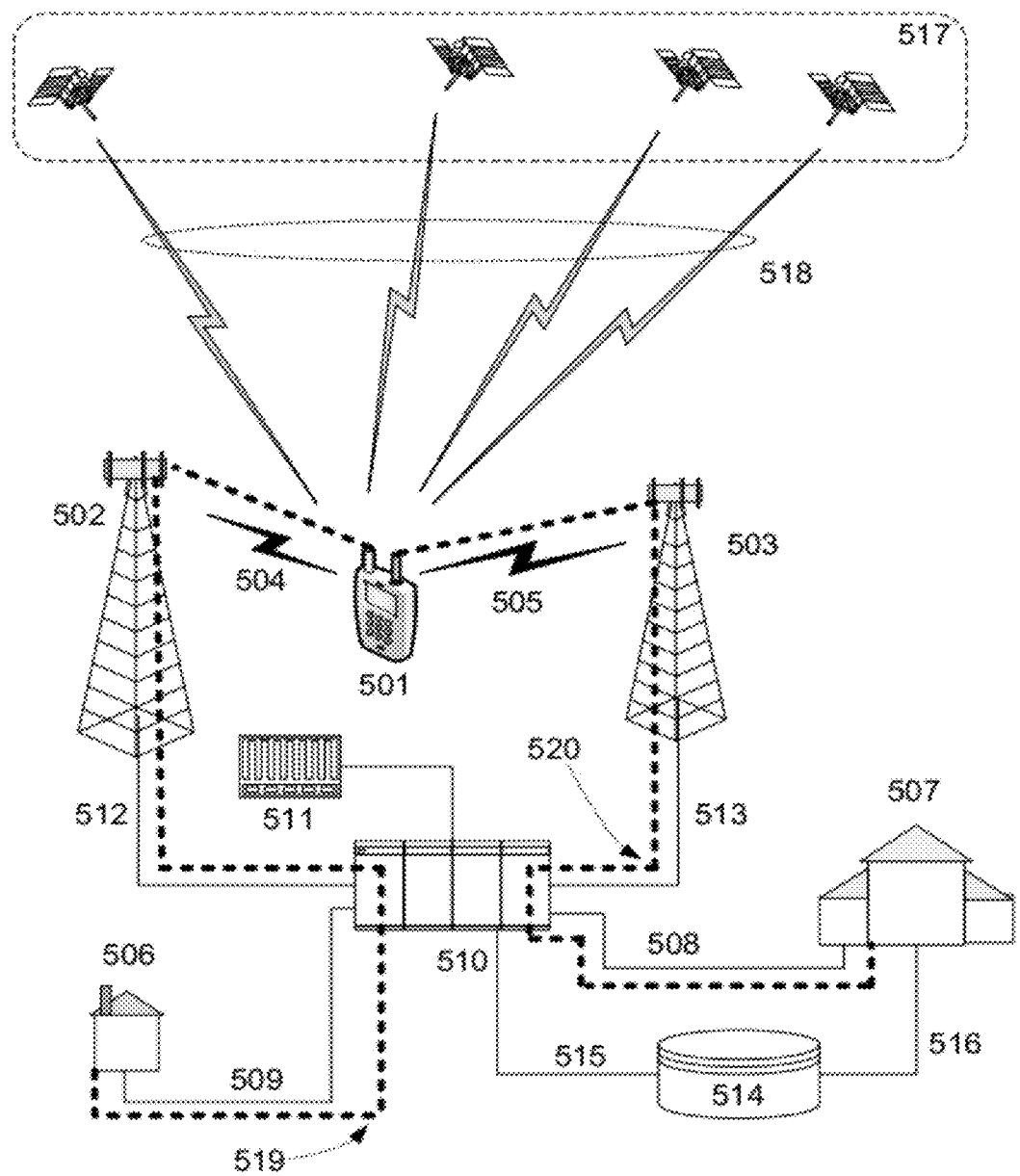
FIG. 5 is an illustration of the interactions between the caretaker, remote locator, wireless network, satellite location network, and emergency services answering point.

FIG. 5—Remote Locator with Relay with Device or Hybrid-Based Location

FIG. 5 depicts the use of a mobile-based or mobile-assisted equipped remote locator in a wireless communication system. A hybrid location approach, combining network-based and device-based location techniques will utilize the same approach.

FIG. 5 shows both the first, control communications path 519 between the locator 501 and the caretaker 506 and the second, emergency call path 520 between the locator 501 and the answering point 507. In FIG. 5 the caretaker 506 still activates the remote locator 501 via the WCN (shown here as the central office 510, base stations 502 503, the first radio path 504, the second radio path 505, and associated voice or data links 508 509 512 513). Once activated, the locator establishes the first, control path 519 and begins to collect satellite broadcast signals 518 from the Global Navigation Satellite System (GNSS) 517. This collection may be aided by information and timing from the WCN assistance server 511. While the satellite signals are being collected, the WCN interconnects the locator 501 to the answering point 507 via a voice trunk 508. Since the caretaker is already online to the locator 501, the answering point and caretaker are then interconnected via the locator device 501 relay.

Once sufficient satellite signals 518 have been collected to form a location (either computed locally within the locator 501 or passed to the assistance server 511 for processing potentially with the addition of network-based measurement for a hybrid location), the CN 510 delivers the location record to the ALI database 514 via data link. The answering point 507 may then request that location using its own data connection 516.

C. Reference Design for-Based Locator with Relay

Figure 6:
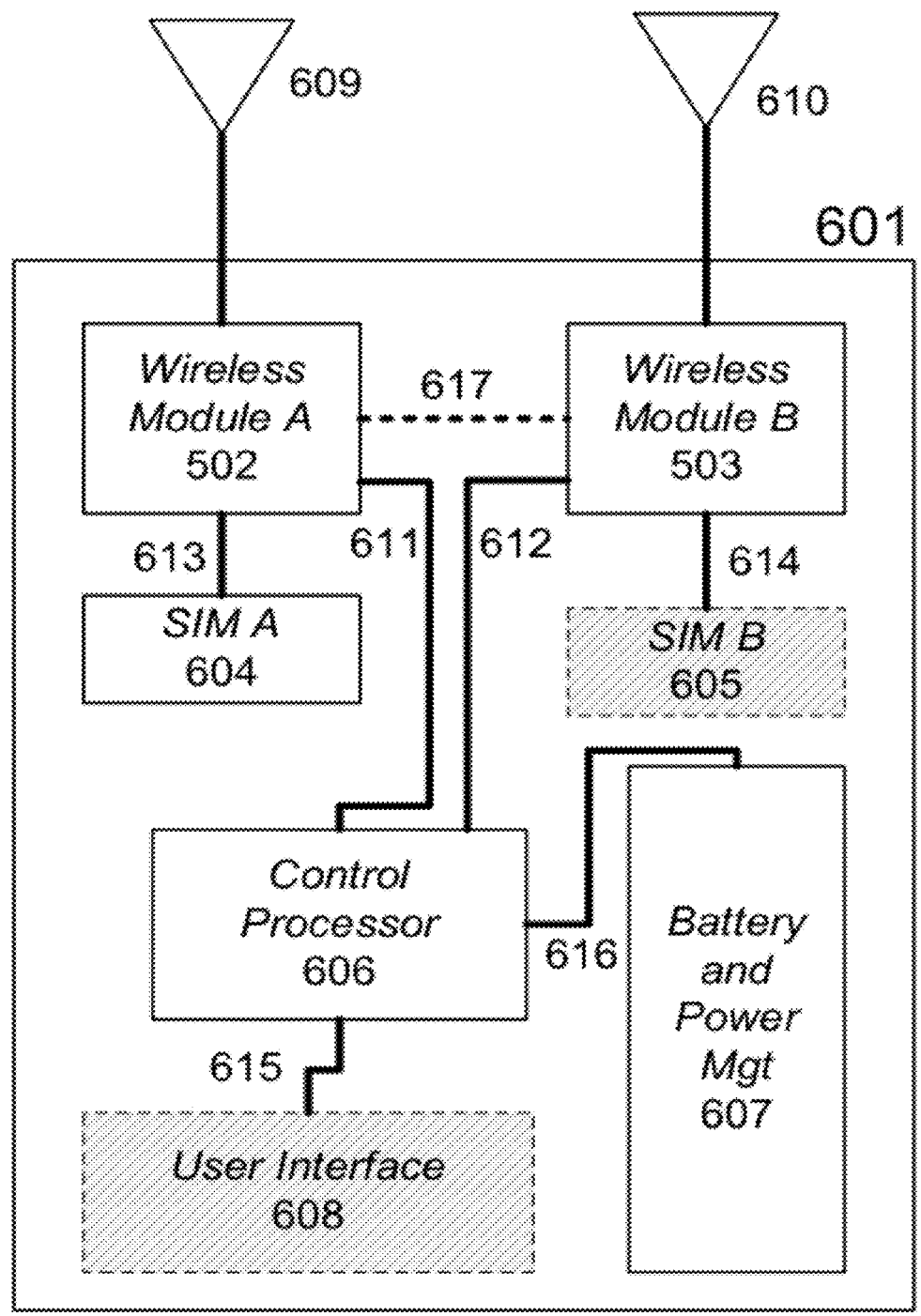
FIG. 6 is a depiction of the major functional subsystems of the locator with relay device.

In FIG. 6, a block diagram of an illustrative embodiment of a locator with relay 601 is shown. This diagram depicts major functional subsystems of the locator with relay 601. This design assumes a dual-frequency band (e.g., 850 MHz (Cellular Band) and 1900 MHz (PCS Band)) design to limit self-interference. The locator 601 shown in this example thus has two antenna 609 610 and two wireless modules 602 603. This design shows two subscriber information modules (SIMs) 604 605. The second SIM 605 is optional in some cases.

The baseband digital signal between the wireless modules A 602 and wireless modules B 603 is shown here routed either via data bus 611 612 to the control processor 606 for signal modification such as volume control, echo cancellation, interception of DTMF control tones from the caretaker or answering point and insertion of pre-recorded messaging into the control or emergency voice path or by the direct connection 617.

The control processor subsystem 606 handles onboard management functions, memory management, and runs local (to the locator) applications such as geofencing, sensor monitoring, power rationing, and data logging. The control processor subsystem 606 can include general processing facilities, digital signal processing (DSP), random access memory and non-volatile digital memory. In practice, the wireless modules 602 603 may be combined with the processor 606 into a single integrated circuit or implemented using a software defined radio to create a pair of virtual transceivers. The power subsystem 607 includes a battery for mobile operation, interconnection for an external power source, and power management circuitry to inform the processor 606 over a data connection 616 of power status.

The locator design in FIG. 6 also shows the optional user interface subsystem 608. The user interface may include audio equipment, visual indicators, and interfaces to internal or external sensors such as temperature, pressure, illumination and g-force shock.

The locator design in FIG. 6 may be used for high-accuracy network-based location and can also be used for low accuracy mobile-based location as supported by the wireless communications network or by off-line, user-plane, data services using $3^{rd}$ party cell location databases. Low accuracy location techniques include cell-id, cell-id with ranging, power-based enhanced cell ID (ECID), Advanced Forward-link Trilateration (AFLT), Enhanced Forward-link Trilateration (EFLT) and Observed Time-Difference-of-Arrival (OTDOA). Such low accuracy location techniques may be used on the control path or emergency path. Broadcast downlink signaling-based wireless location can be used to support geo-fencing or other location needs of the caretaker without involvement of the wireless emergency location network.

D. Reference Design for Mobile-Based/Assisted Locator with Relay

Figure 7:
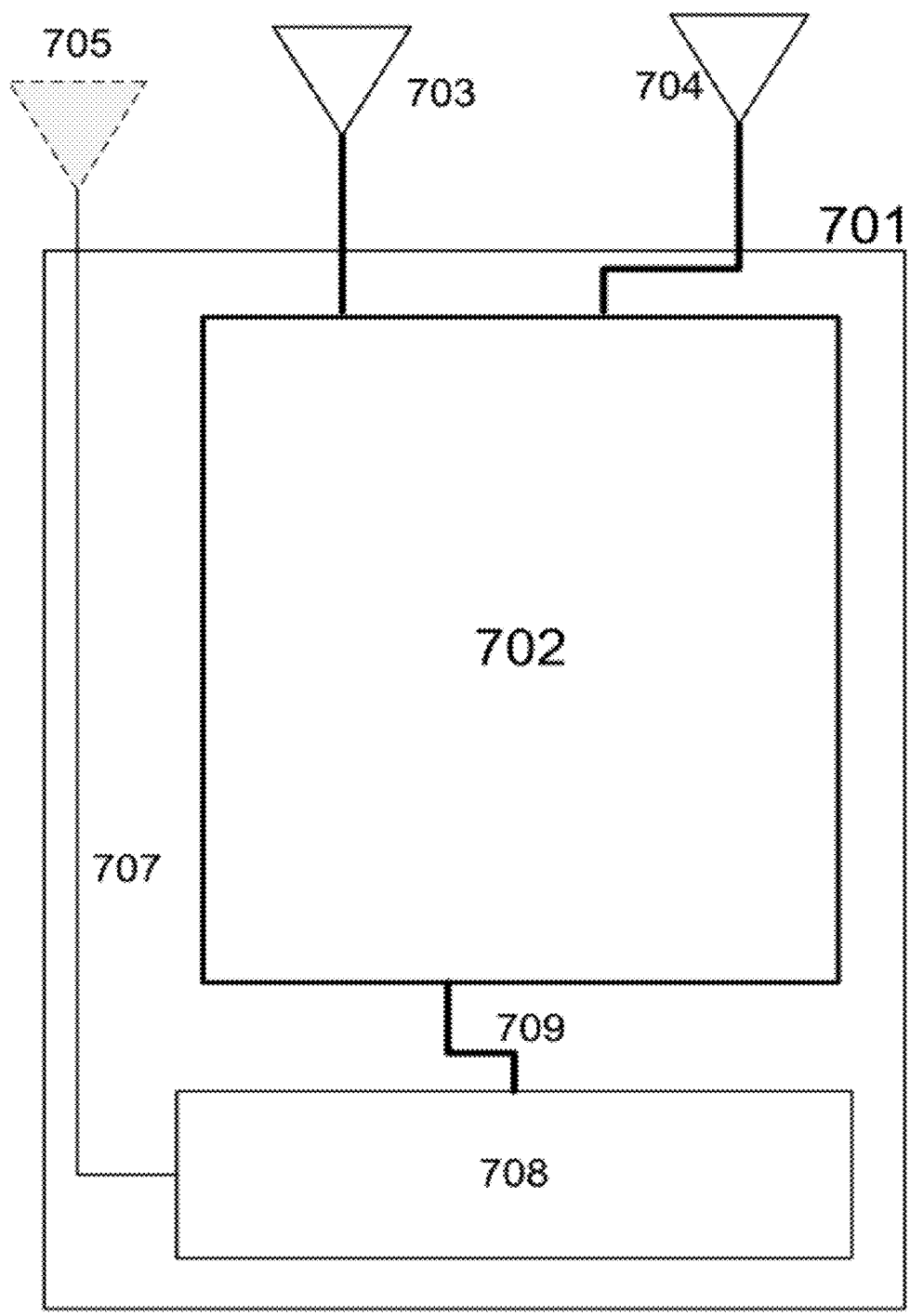
FIG. 7 is a depiction of the locator with relay device equipped for location using satellite signals or terrestrial broadcast networks.

In FIG. 7, a block diagram of the major functional subsystems of a locator with mobile-based or mobile-assisted location capabilities requiring a specialized antenna is depicted. The remote locator 701 in this design supports multiple or multi-band antennae 703 704, which lessen interference between the control and emergency radio paths and radio frequency circuitry. A third antenna 705 is shown for reception of broadcast signals from a satellite constellation (such as the NavStar Global Positioning System (GPS) or terrestrial broadcast network (either purpose built such as the LORAN network or incidental such as the High-Definition television (HDTV) broadcast stations). The navigation antenna 705 is connected to the mobile-based or mobile assisted location subsystem 708 via an antenna feed (or data bus) 707 dependent on the output of the navigation antenna 705.

The other functional subsystems 702 of the locator 701 may be as shown in FIG. 6. The location subsystem 708 is generally connected to the control processor system 608 (FIG. 6) via data bus 709 if not actually incorporated into the control processor. With this arrangement, the control path and emergency path both have access to the mobile-based or mobile-assisted high-accuracy location and either wireless transceiver modules 602 603 (FIG. 6) can be used to convey assistance information to the location subsystem 708.

E. Interaction with Other Location-Based Services

The locator relay device also permits formation of new location-based services. For instance, a geofence system can be arranged based on the broadcast network information (see, for example, U.S. application Ser. No. 11/198,996, filed Aug. 8, 2005, entitled "Geo-fencing in a Wireless Location System") and then report the alarm condition back over the control path allowing the decision to initiate the emergency services call by the custodian before activation of the emergency service location. For mobile-determined location (for examples of mobile-based locator techniques and a geofencing application, see U.S. application Ser. No. 11/323,265, "Device and Network Enabled Geo-Fencing for Area Sensitive Gaming Enablement"). In the case of mobile-based or mobile-assisted location technology, the locator relay could periodically, or on a triggering event, report current location back over the control path allowing the decision to initiate the emergency services call by the custodian before activation of the emergency service location.

For hybrid location systems, the network-based and mobile-based/assisted location technologies can both be used. In one example, the network broadcasts are used for alarming the custodian over the control path. The custodian then orders a mobile-based/assisted location to confirm that the subject is outside the geofenced area, preventing false alarms. The custodian could then activate the emergency services call.

In any case, regardless of the location technology used, the custodian would be placed in contact with the answering point while the locator device position would be found automatically using the location infrastructure deployed for wireless emergency services.

FIG. 8

Figure 8:
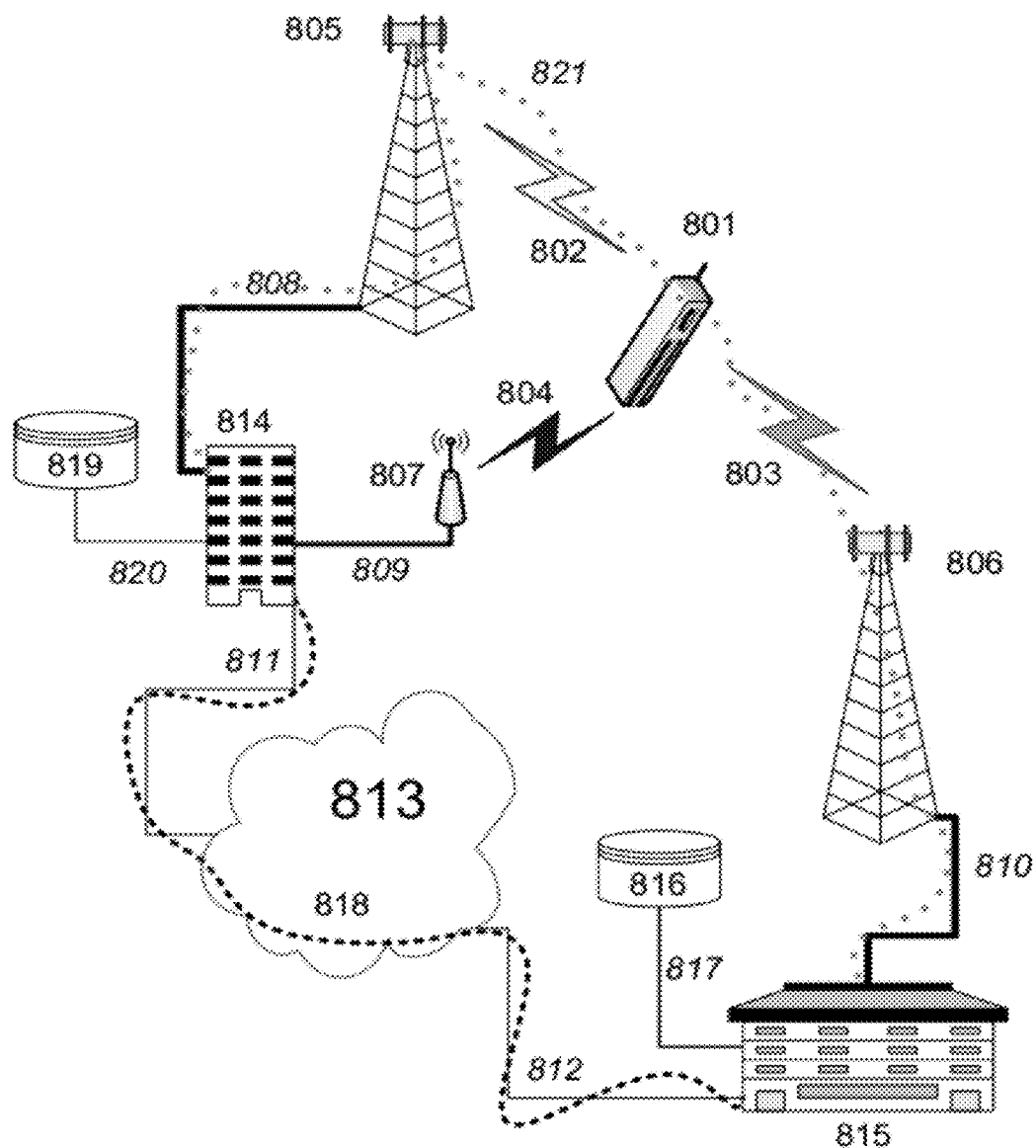
FIG. 8 depicts the multi-transceiver locator in operation.

FIG. 8 geographically depicts the operations of the locator with relay in providing telemetry for advanced services. The locator 801 may initiate the communications session in response to a local trigger (sensor or timer) or a trigger initiated remotely via a message from the control center 814. Using the emergency call (e.g. 9-1-1, 1-1-2, 9-9-9) example, the locator 801 places a call over the radio air interface 803 and the radio access network 806. This call is routed and connected to the PSAP 815 over wired or wireless backhaul 810. This first connection is automatically located by the wireless communications network using either network-based or mobile-device based techniques; the locator's location is stored in the ALI database 816 for delivery or later retrieval using the ALI datalink 817.

The locator 801 also connects with the control center 814 or caretaker via a radio link. This radio link may be provided by a wide area system (e.g. cellular, WiMAX) or a wireless local area network such as UWB, Bluetooth, WiBro or WiFi. This second connection may even be placed over an LTE network. The second connection from the locator 801 goes over the wide area network radio link 802 and then the radio access network 805 and backhaul 808 to the control center 814. Alternately, the second connection from the locator 801 can be made over the local area network radio link 804 and the radio access network point 807 and backhaul 809 to the control center 814. Using the data link 811 from the control center 814, a public or private digital communications network 813 and the data link 812 from the PSAP 815, a back-channel 818 between the control center and PSAP is formed.

Using the multi-transceiver locator with relay 801, the control center 814 and PSAP are now in communication. Voice, telemetry and additional information may now be sent over the first connection to the PSAP, forwarded from the control center, and/or sent via backchannel data link 811 813 812 to the PSAP. Additional information on the locator 801 and locator subject (such as details on the tagged object or holding individual including medical information, identity information, a description of the individual or characteristics of the tagged object) is available in a local or remote database 819 connected to the to the control center 814 via a LAN/WAN datalink 820. The databased information can then be associated with the current call for delivery to the PSAP 815 via the relayed voice channel 821 or the backchannel 818.

In cases where additional bandwidth is needed and wireless facilities exist, the locator 801 under direction of the control center 814 can make use of additional onboard radios and create a third connection over radio link 804. In this example, the radio link 804 is a high throughput connection allowing for high bandwidth data services such as photo(s), video, multi-media, or real-time telemetry to be delivered to the control center for collection, aggregation and distribution to the answering point 815 (PSAP and or caretaker) via backchannel 818.

C. Telemetry Via Backchannel in Operation

FIG. 9

Figure 9:
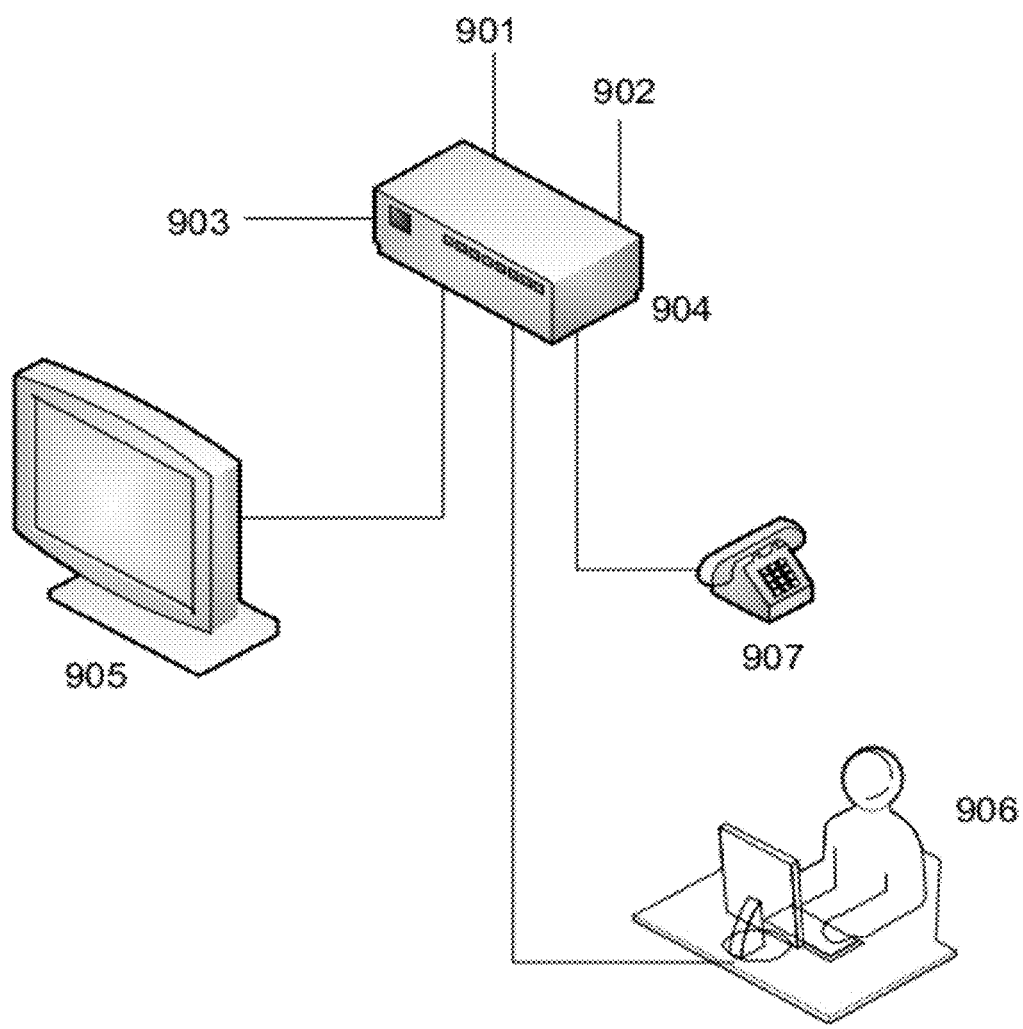
FIG. 9 illustrates an example configuration for automatically joining the data paths.

FIG. 9 depicts an example of the automatic delivery of databased information or locator telemetry data to a PSAP. Both the emergency call 901 and the backchannel 902 enter the PSAP Customer Premise Equipment 904 where they may be automatically associated. Location data messaging 903 either directly from the wireless operator or via the ALI database may also be automatically associated. Since the locator device is aware of the identifiers (e.g. International Mobile Subscriber Identity (IMSI), Temporary Mobile Subscriber Identity (TMSI), International Mobile Equipment Identity (IMEI), Electronic Serial Number (ESN), Mobile Subscriber ISDN Number (MS-ISDN), Calling Number, Global Unique Identifier (GUID)) related to the locator and the current call, these identifiers can be sent to the control center and inserted into the telemetry messaging allowing the multiple message streams to be associated. Once the multiple telemetry and voice message streams have been associated they can be routed to the call taker station 906, viewing screens 905 or to conventional telephony 907.

FIG. 10

Figure 10:
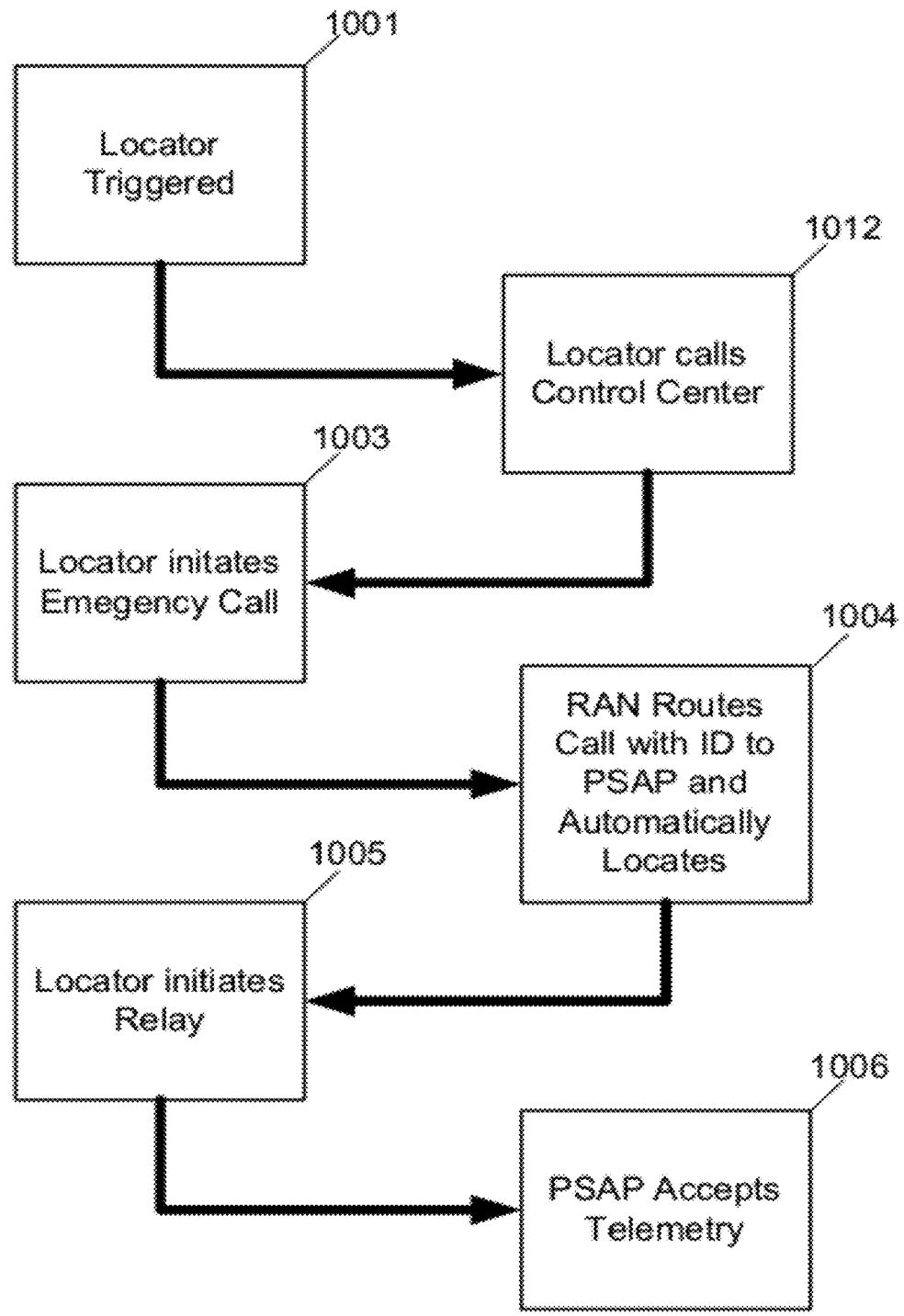
FIG. 10 is an illustration of an example emergency services location process with remote locator with relay activated locally and telemetry provided via forwarding.

FIG. 10 depicts a nominal scenario for an interconnected call session with telemetry. This example offers the operation of the system at an early stage of deployment.

The locator is triggered 1001, resulting in activation from a low-power state. The locator calls the control center 1002 where the determination of an emergency is made. If an emergency call is warranted, the locator initiates an emergency services call 1003. The Radio Access Network (RAN) and telephony network route the call to the PSAP and automatically locate using available location resources (network-based or mobile-based) 1004. Once connected, the locator interconnects the control center and PSAP 1005. At this point, the control center is in communication with the call taker and the availability of telemetry can be conveyed. In the earliest deployments, data will be presented and pulled from the control center's servers via generic browsers at the PSAP.

In later deployments, integration with the PSAP CPE will allow automatic association, routing and display of telemetry data and databased information for delivery of advanced emergency services.

D. Alternative Embodiments

While the present invention assumes the use of the dual transceiver locator with relay, use of the backchannel can in some cases reduce or eliminate the need for the rely function. A dual transceiver locator could be deployed in areas where previous agreement between the control center and PSAP has been reached and CPE capable of automatic association of call and telemetry data has been emplaced.

Use of the dual-transceiver locator with relay would allow for voice communications between the control center and PSAP allowing for ease of service introduction especially for vehicle or property-loss related emergency services.

Single SIM, Dual Transceiver Modules

Unlike the active dual SIM phones, a second SIM is unnecessary under the FCC's 'shall carry' and E911 mandates. A locator relay with one SIM and two transceiver modules can therefore be used. The registered SIM allows for maintenance and remote activation of the locator while the SIM-less, unregistered transceiver can be used to place an emergency services call. In accordance with J-STD-036, a Pseudo-ANI will be allocated for the unregistered transceiver module, allowing for a unique ID and callback at significant cost savings over maintaining two separate registrations for the locator device.

Data Connections

In one embodiment, as shown in FIG. 8, the remotely activatable mobile locator device could include multiple data connections for multiple voice paths, multimedia (sound, photographic and/or video), or telemetry data. Use of non-cellular (WiFi, WiMAX, UWB, etc.) communications for either radio path has been considered and can be used, dependent on the location capabilities of the communications system or locator device, for either the control or emergency leg of the relayed voice/data path.

In cases where higher throughput is required in excess of what is available via the control leg and when wireless facilities are available, the locator under direction of the control center can activate additional onboard radios or request a higher quality of service of the existing control radio path. When an additional radio is installed in the locator (such as a wireless LAN connection), the locator can be commanded to activate, search and then create a third connection over the additional radio link.

When higher quality of services from the wireless communications network are available, then the control leg can command the locator to request additional wireless network resources to service the control leg and provide the necessary bandwidth to service the locator-based sensors (e.g. multimedia).

Since management of data bandwidth is under control of the control center via the control leg, the addition and deletion of radio resources is dynamic and can happen at any time during the call.

As a Software Application

As multi-radio interface wireless devices (e.g. cellular/WiFi, cellular/Bluetooth) the locator can be offered as installed/installable software application. The hardware of the generic wireless device is then capable of supporting the multiple radio links used to create the locator with relay and locator with relay and backchannel functionality.

Single Antenna

In future embodiments, remotely activatable locator device could include a single multi-band antenna and could either split the received signal to use a duplexer dependent on the isolation required by the wireless modules. This approach can be used with the single software defined wireless transceiver module to minimize remote locator with relay size or form factor.

In a multi-bearer, multi-threaded wireless communications network (e.g. LTE) the ability of the wireless device to support multiple communications links with different endpoints (e.g. the control center and the PSAP) will allow the locator to perform its duties using a single antenna and single transceiver.

F. Conclusion

The true scope the present invention is not limited to the illustrative or presently preferred embodiments described herein. For example, the illustrative details described above, e.g., in respect to the locator with relay device of FIG. 6 or the locator with relay device equipped for location using satellite signals or terrestrial broadcast networks of FIG. 7, may be altered without departing from the scope of protection defined by the claims set forth below. In many cases, the place of implementation (i.e., the functional element) described herein is merely a designer's preference and not a hard requirement.

What is claimed:

1. A method for use in providing emergency services to a locator device in a wireless communications network (WCN), wherein the locator device comprises first and second wireless transceiver modules, comprising:
    remotely triggering the locator device and thereby causing the locator device to employ the first wireless transceiver to communicate with a control center and to employ the second wireless transceiver to initiate an emergency services call to a public services answering point (PSAP); and
    providing information relating to the locator device from the control center to the PSAP using a backchannel communications channel from the control center to the PSAP, wherein the information relating to the locator device includes identifiers corresponding to the locator device, said identifiers being sufficient to enable the PSAP to associate information received at the PSAP from the locator device and the control center;
    wherein the backchannel communications channel is formed from a first data link from the control center, a digital communications network coupled to the first data link, and a second data link from the digital communications network to the PSAP; and
    wherein the communication between the locator device and the control center using the first transceiver is conducted via the WCN.

2. A method as recited in claim 1, further comprising providing wireless identifiers corresponding to the locator device in the information provided by the control center to the PSAP to enable the PSAP to associate information received at the PSAP from the locator device and the control center.

3. A method as recited in claim 1, further comprising providing at least one of multimedia, environmental, and medical sensor information from the locator device to the control center, and providing this information from the control center to the PSAP via the backchannel communications channel.

4. A method as recited in claim 1, further comprising providing a location record for the locator device from a database to the PSAP while conducting the emergency services call.

5. A method as recited in claim 1, further comprising providing at least one of environmental and medical sensor information from the locator device to the control center and providing this information from the control center to the PSAP via the backchannel communications channel, and providing a location record for the locator device from a database to the PSAP while conducting the emergency services call.

6. A method as recited in claim 1, wherein the communication between the locator device and the PSAP using the second transceiver is conducted via the WCN; and wherein the communication between the locator device and the control center using the first transceiver is conducted via a WiFi network.

7. A system for use in providing emergency services to a locator device in a wireless communications network (WCN), wherein the locator device comprises first and second wireless transceiver modules, comprising:
    a control center configured for remotely triggering the locator device and thereby causing the locator device to employ the first wireless transceiver to communicate with the control center and to employ the second wireless transceiver to initiate an emergency services call to a public services answering point (PSAP) and for providing information relating to the locator device from the control center to the PSAP using a backchannel communications channel;
    wherein the control center is further configured for providing wireless identifiers corresponding to the locator device in the information provided by the control center to the PSAP to enable the PSAP to associate information received at the PSAP from the locator device and the control center;
    wherein the control center is further configured for receiving at least one of environmental and medical sensor information from the locator device, and for providing this information to the PSAP via the backchannel communications channel;
    wherein the control center is further configured to request a high quality of service for additional network radio resources via the locator device; and
    wherein the backchannel communications channel from the control center to the PSAP is formed from a first data link from the control center, a public or private digital communications network coupled to the first data link, and a second data link from the public or private digital communications network to the PSAP.

8. A system as recited in claim 7, further comprising means for providing a location record for the locator device from a database to the PSAP while conducting the emergency services call.

9. A system as recited in claim 7, wherein the communication between the locator device and the control center using the first transceiver is conducted via the WCN.

10. A system as recited in claim 7, wherein the communication between the locator device and the control center using the first transceiver is conducted via a WiFi network.

11. A system as recited in claim 7, wherein the communication between the locator device and the PSAP using the second transceiver is conducted via the WCN; and wherein the communication between the locator device and the control center using the first transceiver is conducted via a WiFi network.

12. A locator device, comprising:

first and second wireless transceiver modules and a control processor;

wherein the control processor is configured to enable the locator device to be remotely triggered and thereby cause the locator device to employ the first wireless transceiver to communicate with a control center and to employ the second wireless transceiver to initiate an emergency services call to a public services answering point (PSAP), and to provide at least one of environmental and medical sensor information from the locator device to the control center, thus enabling the control center to provide this information to a the PSAP via a backchannel communications channel from the control center to the PSAP, wherein information relating to the locator device and provided to the PSAP includes identifiers corresponding to the locator device, said identifiers being sufficient to enable the PSAP to associate information received at the PSAP from the locator device and the control center; and wherein the backchannel communications channel is formed from a first data link from the control center, a digital communications network coupled to the first data link, and a second data link from the digital communications network to the PSAP.

13. A method for use in providing emergency services to a locator device in a wireless communications network (WCN), wherein the locator device comprises first, second and third wireless transceiver modules, comprising:

remotely triggering the locator device and thereby causing the locator device to employ the first wireless transceiver to communicate with a control center via a wide area link or a local area link, and to employ the second wireless transceiver to initiate an emergency services call to a public services answering point (PSAP);

adding additional radio resources by activating additional transceivers as needed to meet the data bandwidth needed by the locator device's on-board sensors; and providing information relating to the locator device from the control center to the PSAP using a backchannel communications channel from the control center to the PSAP, wherein the information relating to the locator device includes identifiers corresponding to the locator device, said identifiers being sufficient to enable the PSAP to associate information received at the PSAP from the locator device and the control center;

wherein the backchannel communications channel is formed from a first data link from the control center, a digital communications network coupled to the first data link, and a second data link from the digital communications network to the PSAP.

14. A method as recited in claim 13, further comprising providing information relating to the locator device from the control center to the PSAP using a backchannel communications channel.

15. A method as recited in claim 14, wherein the control center requests a high quality of service for additional network radio resources via the locator device.

16. A method for use in providing emergency services to a locator device in a wireless communications network (WCN), wherein the locator device comprises first and second wireless transceiver modules, comprising:

remotely triggering the locator device and thereby causing the locator device to employ the first wireless transceiver to communicate with a control center and to employ the second wireless transceiver to initiate an emergency services call to a public services answering point (PSAP); and providing information relating to the locator device from the control center to the PSAP using a backchannel communications channel from the control center to the PSAP, wherein the information relating to the locator device includes identifiers corresponding to the locator device, said identifiers being sufficient to enable the PSAP to associate information received at the PSAP from the locator device and the control center;

wherein the backchannel communications channel is formed from a first data link from the control center, a digital communications network coupled to the first data link, and a second data link from the digital communications network to the PSAP; and wherein the communication between the locator device and the control center using the first transceiver is conducted via a WiFi network.

* * * * *